United States Patent
Enomoto et al.

(10) Patent No.: US 8,186,659 B2
(45) Date of Patent: May 29, 2012

(54) SUSPENSION DEVICE

(75) Inventors: Mitsuru Enomoto, Hino (JP); Kaoru Nakamura, Hino (JP); Koko Fukunaga, Hino (JP)

(73) Assignees: Hino Motors, Ltd., Hino-shi (JP); NHK Spring Co., Ltd., Yokohama-shi (JP)

( * ) Notice: Subject to any disclaimer, the term of this patent is extended or adjusted under 35 U.S.C. 154(b) by 434 days.

(21) Appl. No.: 12/474,382

(22) Filed: May 29, 2009

(65) Prior Publication Data

US 2009/0302513 A1    Dec. 10, 2009

(30) Foreign Application Priority Data

Jun. 4, 2008   (JP) ................................. 2008-146489

(51) Int. Cl.
*B60G 11/12*   (2006.01)
*F16F 1/28*   (2006.01)
(52) U.S. Cl. .................. 267/271; 267/36.1; 267/269
(58) Field of Classification Search ............ 267/27, 267/29, 32, 36.1, 38, 40, 42, 43, 44, 45, 47, 267/49, 260, 261, 262, 269, 271
See application file for complete search history.

(56) References Cited

U.S. PATENT DOCUMENTS

| 63,668 | A | * | 4/1867 | Stone | 267/40 |
| 153,612 | A | * | 7/1874 | Richardson | 267/43 |
| 1,880,861 | A | * | 10/1932 | Davis | 267/47 |
| 2,476,367 | A | | 7/1949 | Guernsey | |
| 2,663,563 | A | * | 12/1953 | Watson | 267/49 |
| 2,920,884 | A | * | 1/1960 | Rowland et al. | 267/49 |

FOREIGN PATENT DOCUMENTS

| DE | 3928844 A1 | * | 3/1991 |
| DE | 4239512 A1 | * | 5/1994 |
| FR | 1 449 011 | | 8/1966 |
| FR | 2 620 659 | | 3/1989 |
| JP | 03000334 A | * | 1/1991 |
| JP | 04039431 A | * | 2/1992 |
| JP | 04039432 A | * | 2/1992 |
| JP | 2004-306805 | | 11/2004 |

* cited by examiner

*Primary Examiner* — Thomas J Williams
(74) *Attorney, Agent, or Firm* — Oblon, Spivak, McClelland, Maier & Neustadt, L.L.P.

(57) ABSTRACT

Interplate rubber members 15 are interposed between abutting front and rear ends of spring leaves 2A and 2B. The spring leaves 2A and 2B have paired curved portions 14A and 14B, respectively, which are symmetrically S-shaped with respect to a connected position of an axle 3 in side view. A curvature radius of continuous and mutually reverse curves of each of the curved portions 14A of the upper spring leaf 2A is greater than a curvature radius of continuous and mutually reverse curves of each of the curved portions 14B of the lower spring leaf 2B. The upper curved portions 14A have longitudinally outward bend starts longitudinally outward of longitudinally outward bend starts of the lower curved portions 14B and have longitudinally inward bend ends longitudinally inward of longitudinally inward bend ends of the lower curved portions 14B.

2 Claims, 5 Drawing Sheets

SUSPENSION DEVICE

BACKGROUND OF THE INVENTION

1. Field of the Invention

The present invention relates to a suspension device.

2. Description of the Related Art

Among various devices for suspension of axles from a frame, a suspension device comprising laminated spring leaves has been prevailing for vehicles such as trucks since it is simple in structure, inexpensive in cost, high in strength and highly durable.

FIG. 1 shows a conventional leaf-spring suspension device in which reference numeral 1 denotes a pair of left and right side rails extending longitudinally or in a fore-and-aft direction of a vehicle and providing part of a chassis frame; 2A and 2B, laminated spring leaves arranged along each of the side rails 1; and 3, an axle in the form of a beam member. The axle 3 is connected from below to longitudinally intermediate portions of the spring leaves 2A and 2B, using U-bolts 4.

The spring leaves 2A and 2B have front ends upwardly wound into eyes 5A and 5B, respectively, for pivotal motion about a spring pin 7 of a front bracket 6 secured to the side rail 1.

The upper spring leaf 2A has a rear end upwardly wound, just like its frond end, into an eye 8A for pivotal motion with a spring pin 11 of a shackle 10 about a rear bracket 9 secured to the side rail 1. Expansion and contraction of the spring leaves 2A and 2B in the fore-and-aft direction due to arched deflection of the same are absorbed or accommodated by the pivotal movement of the shackle 10.

At the carried position of the axle 3 by the spring leaves 2A and 2B via the U-bolts 4, a bracket 12 is also fixed by the U-bolts 4. A tip end of the bracket 12 is connected by a shock absorber 13 to the side rail 1 arranged just above the bracket 12.

This kind of leaf-spring suspension device has been disclosed, for example, in JP 2004-306805A.

In the conventional device, the spring leaves 2A and 2B are deflected at vertically unaligned positions so that relative displacement is inevitably caused between the leaves 2A and 2B upon such deflecting, resulting in metal-to-metal contact at front and rear ends of the spring leaves 2A and 2B. Thus, a greater frictional resistance is produced to produce a greater reaction force tending to constrain the relative displacement between the spring leaves 2A and 2B so that the leaves 2A and 2B become less deflectable, resulting in difficulty in satisfactorily lowering the spring constant and thus difficulty in satisfactorily improving comfort of the vehicle ride.

Accommodation of the expansion and contraction of the spring leaves 2A and 2B in the fore-and-aft direction upon deflecting of the same by pivotal movement of the shackle 10 causes the axle 3 to have a slantwise rearward ascending trajectory; thus, when the vehicle body has roll motion upon cornering of the vehicle, the axle 3 is displaced rearward and forward on vehicle-body sinking and floating sides transversely of the vehicle, respectively, resulting in occurrence of axle or roll steer which may adversely affect the driveability.

The invention was made in view of the above and has its object to provide spring leaves more deflectable than ever before for improvement in comfort of the vehicle ride and suppressing the occurrence of the axle or roll steer upon roll motion for improvement of the driveability.

SUMMARY OF THE INVENTION

The invention is directed to a suspension device with upper and lower laminated spring leaves for suspension of an axle from a vehicle body, comprising interplate rubber members interposed between abutting front and rear ends of the spring leaves, each of the spring leaves having paired curved portions symmetrically S-shaped in side view with respect to a connected position of the axle, continuous and mutually reverse curves of each of the curved portions of the upper spring leaf having a curvature radius greater than a curvature radius of continuous and mutually reverse curves of each of the curved portions of the lower spring leaf, the curved portions of the upper spring leaf having longitudinally outward bend starts longitudinally outward of longitudinally outward bend starts of the curved portions of the lower spring leaf and having longitudinally inward bend ends longitudinally inward of longitudinally inward bend ends of the curved portions of the lower spring leaf.

Thus, any relative displacement between the spring leaves upon deflecting of the same may be accommodated by shear strain of the interplate rubber members, so that a great frictional resistance is not produced unlike the conventional metal-to-metal contact to substantially reduce the reaction force tending to constrain the relative displacement of the spring leaves.

The respective upper and lower spring leaves have the paired curved portions formed longitudinally oppositely and symmetrically with the different curvature radii and vertically unaligned bend starts and bend ends so that relative displacement between the leaves is reduced upon deflecting of the leaves.

Since the reaction force, which tends to constrain the relative displacement between the spring leaves, is calculated as multiplication of the relative displacement between the leaves by the spring constant of the interplate rubber members, the reduction in the relative displacement between the leaves causes the reaction force to be reduced further in comparison with mere interposition of the interplate rubber members, so that spring leaves become easily deflectable, resulting in reduction of the spring constant.

It has been also confirmed that not only the spring constant is reduced but also dynamic characteristics of the spring leaves are also substantially improved, which makes the spring leaves easily deflectable at their deflection starts and deflection ends, resulting in even softer comfort of the vehicle ride.

Furthermore, the paired curved portions of the spring leaves act articulatingly to remedy the slantwise rearward ascending trajectory of the axle into the trajectory upstanding more than ever before. As a result, even when the vehicle body has roll motion upon cornering of the vehicle, the axle is not largely displaced rearward and forward on the vehicle-body sinking and floating sides, respectively, resulting in suppression of the occurrence of the axle or roll steer and little adverse affection on driveability.

An embodiment of the invention will be described in conjunction with the drawings.

DESCRIPTION OF THE PREFERRED EMBODIMENTS

Figure 1:
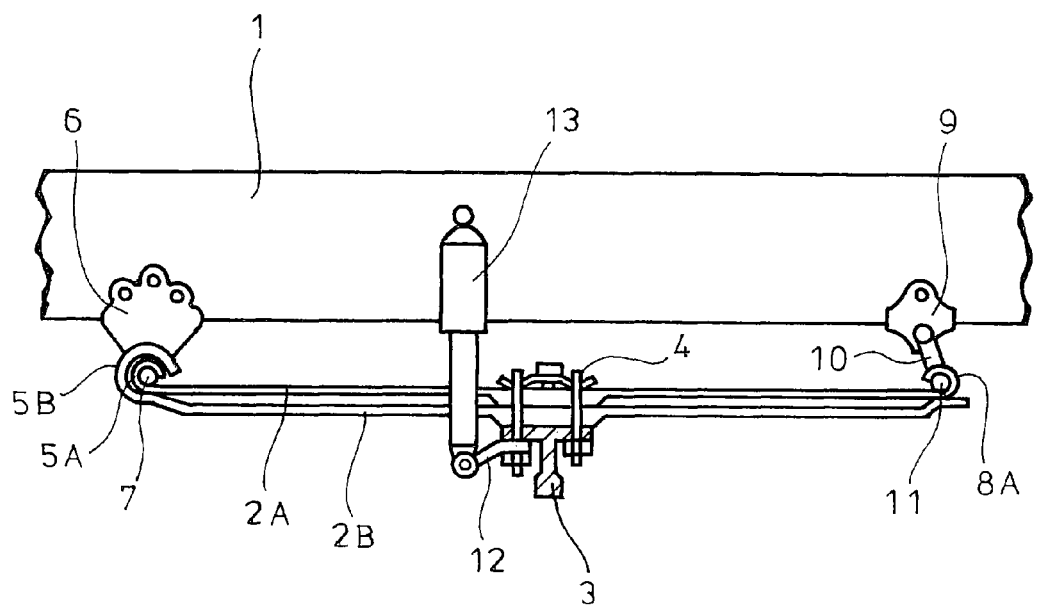
FIG. 1 is a side view showing a conventional suspension device.

FIGS. 2-6 show an embodiment of the invention in which parts similar to those in FIG. 1 are represented by the same reference numerals.

Figure 2:
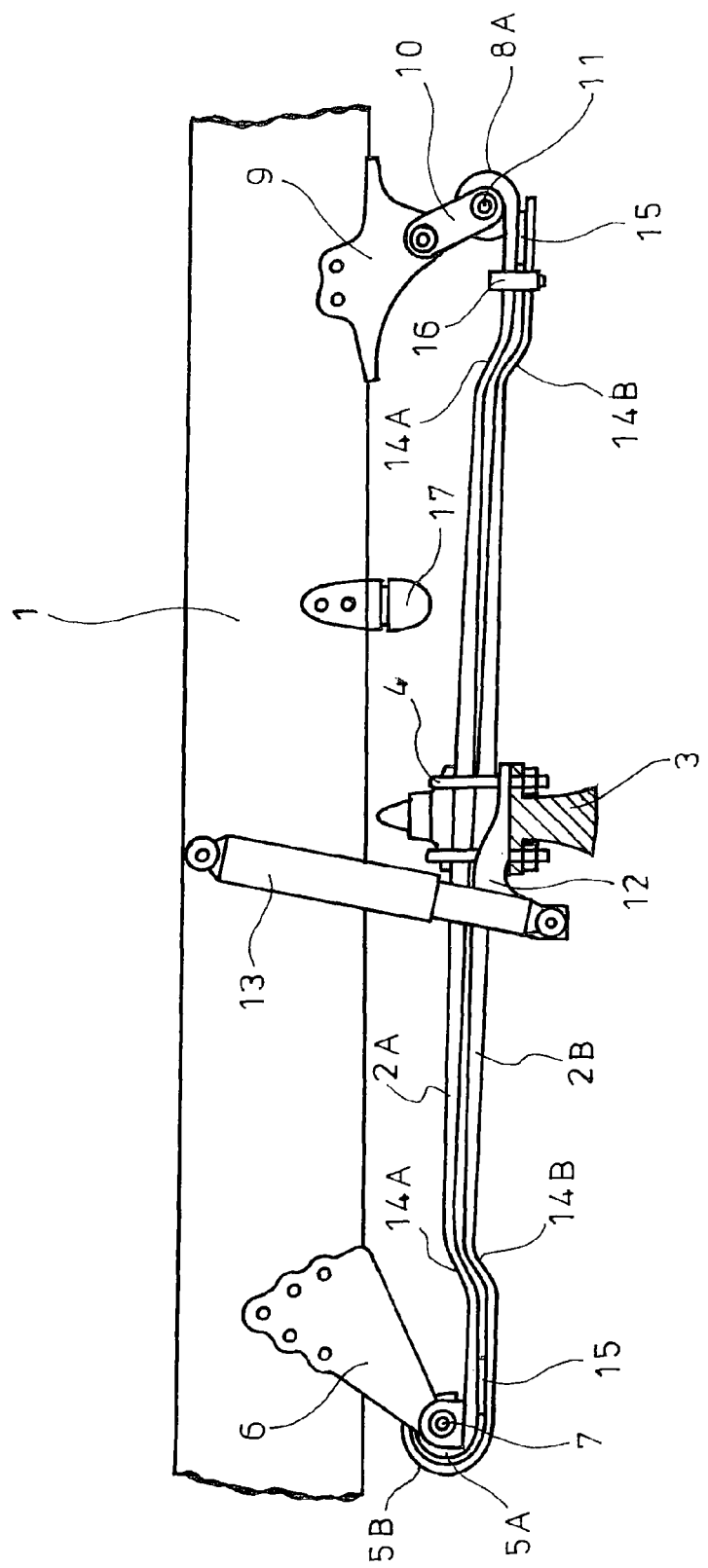
FIG. 2 is a side view showing an embodiment of the invention.
Figure 3:
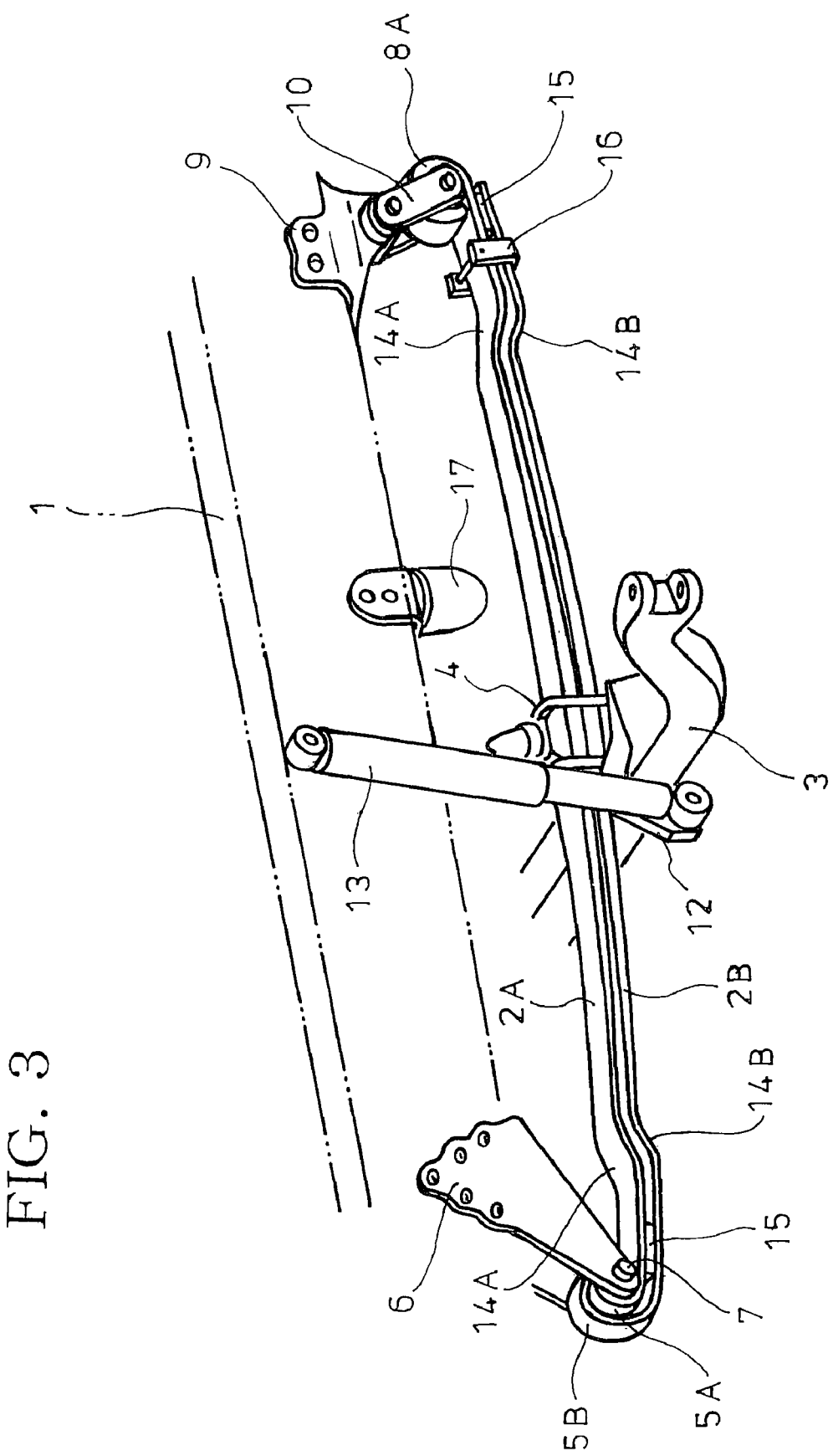
FIG. 3 is a perspective view of the suspension device shown in FIG. 2.

As shown in FIGS. 2 and 3, in the embodiment, just like the related art shown in FIG. 1, an axle 3 is suspended from a side rail 1 by upper and lower laminated spring leaves 2A and 2B and is connected from below to longitudinally intermediate portions of the spring leaves 2A and 2B, using U-bolts 4. A tip end of a bracket 12 which is also fixed at the portions, using the U-bolts 4, is connected to the side rail 1 arranged just above the bracket 12 by a shock absorber 13.

Front ends of the spring leaves 2A and 2B are upwardly wound into eyes 5A and 5B for pivotal motion via a rubber bush (not shown) about a spring pin 7 of a front bracket 6 secured to the side rail 1. A rear end of the upper spring leaf 2A is wound upwardly, just like its front end, into an eye 8A for pivotal motion via a rubber bush (not shown) with a spring pin 11 of a shackle 10 about a rear bracket 9 secured to the side rail 1, so that expansion and contraction of the spring leaves 2A and 2B in the fore-and-aft direction due to arched deflection of the same are accommodated by the pivotal movement of the shackle 10. In the drawings, reference numeral 16 denotes a rectangular-frame-like clip attached to the rear end of the lower spring leaf 2B and slidably engaged with the rear end of the upper spring leaf 2A.

In the embodiment, interposed between the abutting front and rear ends of the spring leaves 2A and 2B are interplate rubber members 15 each fitted to either of confronting surfaces of the leaves 2A and 2B through, for example, vulcanization. The spring leaves 2A and 2B have paired curved portions 14A and 14B, respectively, which are symmetrically S-shaped with respect to a connected position of the axle 3 in side view. As illustrated, at longitudinally outward positions of each leaf, each of the curved portions 14A or 14B starts to be curved inward and upward and then curved back reversely into a curved end.

Specifically, the inventors earnestly made studies and researches to conceive of interposing the interplate rubber members 15 between the abutting front and rear ends of the laminated spring leaves 2A and 2B for suspension of the axle 3 from the side rail 1 so as to accommodate any relative displacement between the leaves 2A and 2B upon deflecting of the same by shear strain, and to find out the fact that such relative displacement itself between the leaves 2A and 2B upon deflecting of the same may be decreased by forming paired curved portions 14A or 14B as shown at opposed positions of each of the leaves 2A and 2B, these curved portions 14A and 14B being added as novel structural factors not existing in any existing spring leaves 2A and 2B.

Figure 4:
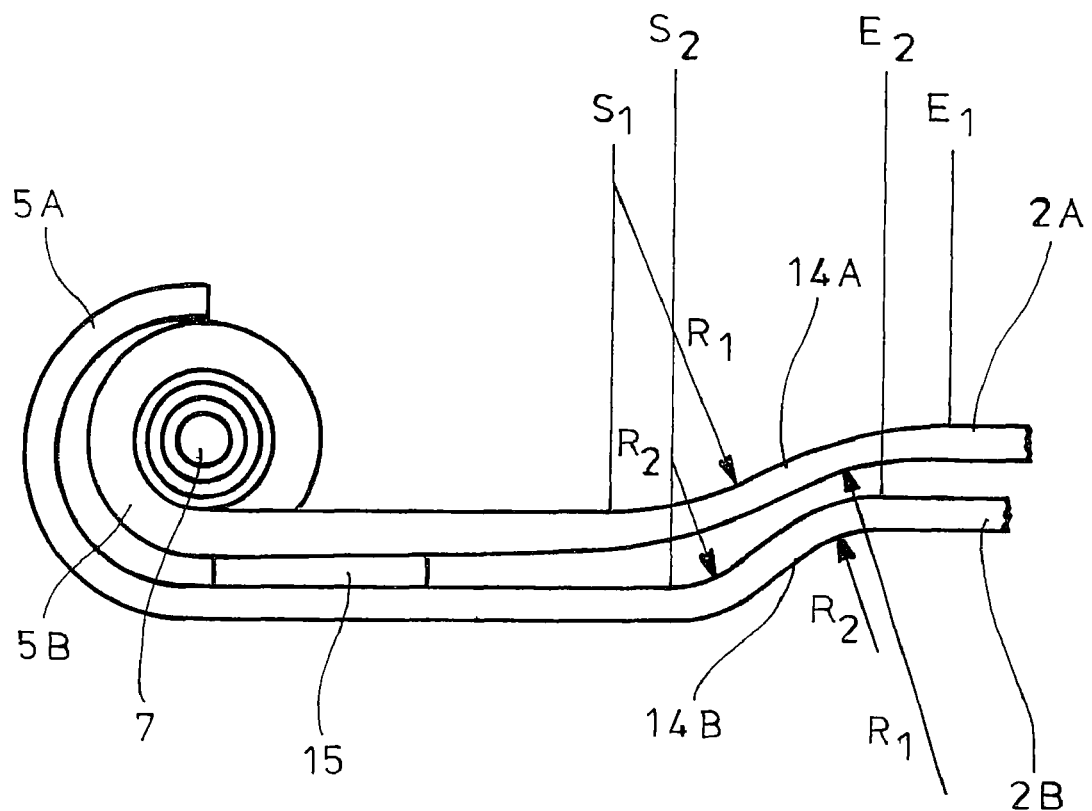
FIG. 4 is a view for explanation of conditions to be changed with respect to the curved portions of the upper and lower leaves shown in FIG. 1.

Each of the curved portions 14A or 14B requires to be formed at a suitable position over a suitable range adjacent to the front or rear end of the leaf 2A or 2B depending upon various conditions such as length, thickness and elasticity of the leaf 2A or 2B. Most important structural factors found out by the inventors are, as shown in FIG. 4 in enlarged scale, that a curvature radius $R_1$ of each of continuous and mutually reverse curves of the curved portion 14A of the upper spring leaf 2A is greater than a curvature radius $R_2$ of each of continuous and mutually reverse curves of the curved portion 14B of the lower spring leaf 2B and that a longitudinally outward bend start $S_1$ of the curved portion 14A of the upper spring leaf 2A is longitudinally outward (left in FIG. 3 since the figure shows the front end side of the leaves) of a longitudinally outward bend start $S_2$ of the curved portion 14B of the lower spring leaf 2B and a longitudinally inward bend end $E_1$ of the curved portion 14A of the upper spring leaf 2A is longitudinally inward (right in FIG. 3 since the figure shows the front end side of the leaves) of a longitudinally inward bend end $E_2$ of the curved portion 14B of the lower spring leaf 2B.

As to the curvature radii $R_1$ and $R_2$ of the curves of the curved portions 14A and 14B, there may exist proper combinations thereof depending upon conditions of lengths, thicknesses and elasticities of the spring leaves 2A and 2B; an optimum combination may be found out by analyzing the various combinations, using the radii $R_1$ and $R_2$ as parameters.

In fact, the inventors fabricated prototypes with combined curvature radii $R_1$ and $R_2$ calculated by the analysis to conduct verification experiments, and found out that relative displacement between the spring leaves 2A and 2B upon deflecting of the same can be remarkably decreased in comparison with cases having no curved portions 14A and 14B; it was revealed in the verification experiments that, in comparison with the cases having no curved portions 14A and 14B where a maximum relative displacement between the leaves was about 11 mm, a maximum relative displacement between the leaves could be reduced to about 9.5 mm (difference by 1.5 mm) in cases having the curved portions 14A and 14B.

In FIGS. 2 and 3, reference numeral 17 denotes a rubber stopper which prevents portions of the spring leaves 2A and 2B rearward of the axle 3 from being deflected upwardly when a torque acts on the axle 3 upon, for example, braking to thereby serve as stopper for preventing S-shaped deflection or wind-up of the spring leaves 2A and 2B. The rubber stopper 17 also serves as helper abutting on and cooperated with the spring leaves 2A and 2B when the spring leaves 2A and 2B are deflected excessively beyond a predetermined level.

Thus, any relative displacement between the spring leaves 2A and 2B upon deflecting of the same can be accommodated by shear strain of the interplate rubber members 15, so that a great frictional resistance is not produced unlike the conventional metal-to-metal contact, which substantially reduces the reaction force tending to constrain the relative displacement of the spring leaves 2A and 2B.

Moreover, the paired curved portions 14A and 14B are longitudinally oppositely and symmetrically formed on the upper and lower spring leaves 2A and 2B and have the different curvature radii $R_1$ and $R_2$ and the unaligned bend starts $S_1$ and $S_2$ and bend ends $E_1$ and $E_2$, respectively, so that relative displacement between the leaves 2A and 2B upon deflecting of the same is reduced.

Since the reaction force, which tend to constrain the relative displacement between the spring leaves 2A and 2B, is calculated as multiplication of relative displacement between the leaves by spring constant of the interplate rubber members 15, the reaction force is further reduced when the relative displacement between the leaves is reduced in comparison with mere interposing of the interplate rubber members 15, so that the spring leaves 2A and 2B become easily deflectable, resulting in substantial reduction in spring constant.

It has been also confirmed that not only the spring constant is reduced but also dynamic characteristics of the spring leaves 2A and 2B are also substantially improved, which makes the spring leaves 2A and 2B easily deflectable at their deflection starts and deflection ends, resulting in even softer comfort of the vehicle ride.

Figure 5:
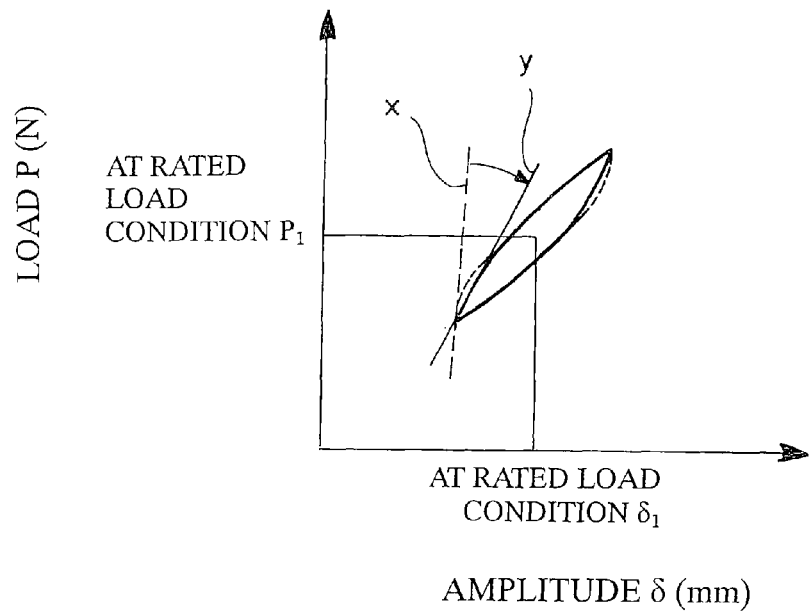
FIG. 5 is a graph for comparison of dynamic characteristics between leaf springs with and without curved portions.

Specifically, it has been confirmed that, as shown in the graph of FIG. 5 in which hysteresis loop is plotted with ordinate and abscissa representing load and amplitude, respectively, the hysteresis loop with steep riding gradient x as shown in dotted lines is obtained in the cases with no curved portions 14A and 14B whereas the hysteresis loop with mild riding gradient y as shown in solid line is obtained in the cases with curved portions 14A and 14B.

The rising gradients x and y are tangent lines drawn on approximating curves of the respective hysteresis loops at their deflection starts; though not shown in the graph of FIG. 5, similar gradients may be obtained for comparison at deflection ends of the respective hysteresis loops.

Furthermore, the paired curved portions 14A and 14B of the spring leaves 2A and 2B act articulatingly to remedy the slantwise rearward ascending trajectory of the axle 3 into the trajectory upstanding more than ever before. As a result, even when the vehicle body has roll motion upon cornering of the vehicle, the axle 3 is not largely displaced rearward and forward at vehicle-body sinking and floating sides, respectively, resulting in suppressing the occurrence of axle or roll steer and little adverse affection on driveability.

Figure 6:
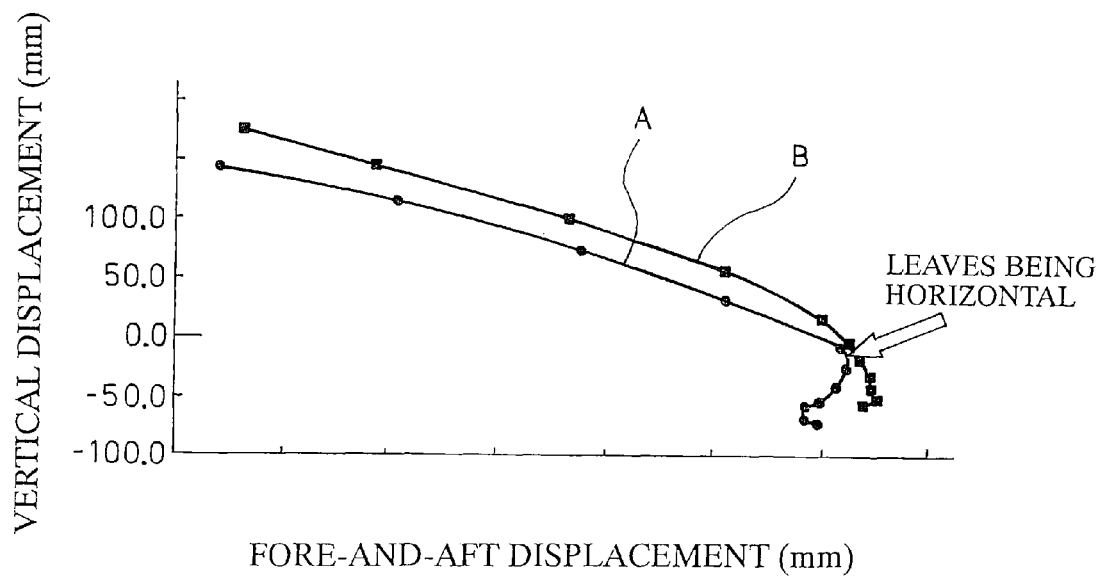
FIG. 6 is a graph for comparison of axle trajectories between leaf springs with and without curved portions.

In fact, as shown in the graph of FIG. 6, the trajectories of the central portions of the leaf springs (the axle 3 trajectories) were verified in the cases with the curved portions 14A and 14B (curve A) and in the cases with no curved portions 14A and 14B (curve B) to find out that the slantwise rearward ascending trajectory of the axle 3 is remedied by the formation of the curved portions 14A and 14B.

Specifically, in the graph of FIG. 6 with the ordinate and abscissa representing vertical and fore-and-aft displacements, respectively, the trajectory of the central portions of the leaves is plotted with the spring leaves 2A and 2B being turned upside down for facilitation of the experiments and being deflected. It is found from the figure that in the cases with no curved portions 14A and 14B (curve B), the trajectory continues to be displaced rearward, from the state of the spring leaves 2A and 2B being greatly deflected downward (upward in the graph of FIG. 6) via the state of the leaves being horizontal to the state of the leaves being deflected upward (downward in the graph of FIG. 6) whereas, in the cases with the curved portions 14A and 14B (curve A), the trajectory is returned back forward after the leaves becomes horizontal. Comparison of the trajectories by drawing tangent lines on approximating curves adjacent the state of the spring leaves being horizontal reveals that the slantwise rearward ascending trajectory of the central portions of the leaves (the trajectory of the axle 3) has been remedied.

Thus, according to the above embodiment, relative displacement between the spring leaves 2A and 2B upon deflecting of the same is accommodated by shear strain of the interplate rubber members 15 and relative displacement between the spring leaves 2A and 2B upon deflecting of the same is decreased by forming the curved portions 14A and 14B, so that the reaction force tending to constrain the relative displacement between the spring leaves 2A and 2B can be substantially reduced. As a result, the spring leaves 2A and 2B becomes easily deflectable to reduce the spring constant, and the dynamic characteristics of the spring leaves are substantially improved to enhance deflectability at deflection starts and deflection ends, these effects synergetically act to substantially improve the comfort on the vehicle ride more than ever before.

Since the slantwise rearward ascending trajectory of the axle 3 is remedied into the trajectory upstanding more than ever before, the occurrence of axle steer is suppressed when the vehicle body has roll motion, resulting in substantial improvement of driveability more than ever before.

It can be further added as advantages that, when such suspension device is applied to the front sides, the slantwise rearward ascending trajectory of the axle 3 is remedied into the trajectory upstanding more than ever before, so that a trajectory of a connected position of a link mechanism of a steering system to the axle 3 become easily matchable, and any vibrations on the steering system due to link interference and link-motion error (undesirable steering due to vertical movements of the spring leaves 2A and 2B) can be prevented.

Specifically, since the trajectory of the connected position of the link mechanism of the steering system to the axle 3 is in the form of vertical arc about a connection on the vehicle body ahead of the axle 3, disagreement is increased to the trajectory of the axle 3 when the axle has the slantwise rearward ascending trajectory and the vehicle body is sank, which fact increases the possibility of the above-mentioned vibrations on the steering system due to the link interference as well as the link-motion error, and countermeasure must be taken such as displacement of the connected position on the steering system; however, when the slantwise rearward ascending trajectory of the axle 3 is remedied, the above-mentioned fears are easy to overcome.

Moreover, particularly in the embodiment, the front and rear ends of the spring leaves 2A and 2B are mounted to the spring pins 7 and 11 via the rubber bushes (not shown). Irrespective of that, increase in the vehicle height is prevented from occurring since the curved portions 14A and 14B are provided; otherwise the vehicle height would be increased by the thickness of the bushes.

It is to be understood that a suspension device according to the invention is not limited to the above embodiment and that various changes and modifications may be made without leaving the spirit of the invention.

What is claimed is:

1. A suspension device with upper and lower laminated spring leaves for suspension of an axle from a vehicle body, comprising
spring leaves, each of the spring leaves having paired curved portions symmetrically S-shaped in side view with respect to a connected position of the axle, continuous and mutually reverse curves of each of the curved portions of the upper spring leaf having a curvature radius greater than a curvature radius of continuous and mutually reverse curves of each of the curved portions of the lower spring leaf, the curved portions of the upper spring leaf having longitudinally outward bend starts longitudinally outward of longitudinally outward bend starts of the curved portions of the lower spring leaf and having longitudinally inward bend ends longitudinally inward of longitudinally inward bend ends of the curved portions of the lower spring leaf, wherein each of the spring leaves is straight between the paired curved portions; and
interplate rubber members interposed between abutting front and rear ends of the spring leaves.

2. The suspension device according to claim 1, wherein each of the spring leaves is straight at a longitudinal portion longitudinally outward of the longitudinally outward bend starts, and wherein the interplate rubber members are interposed between the spring leaves at the longitudinal locations of the longitudinal straight portions longitudinally outward of the longitudinally outward bend starts.

* * * * *